Figure 1:
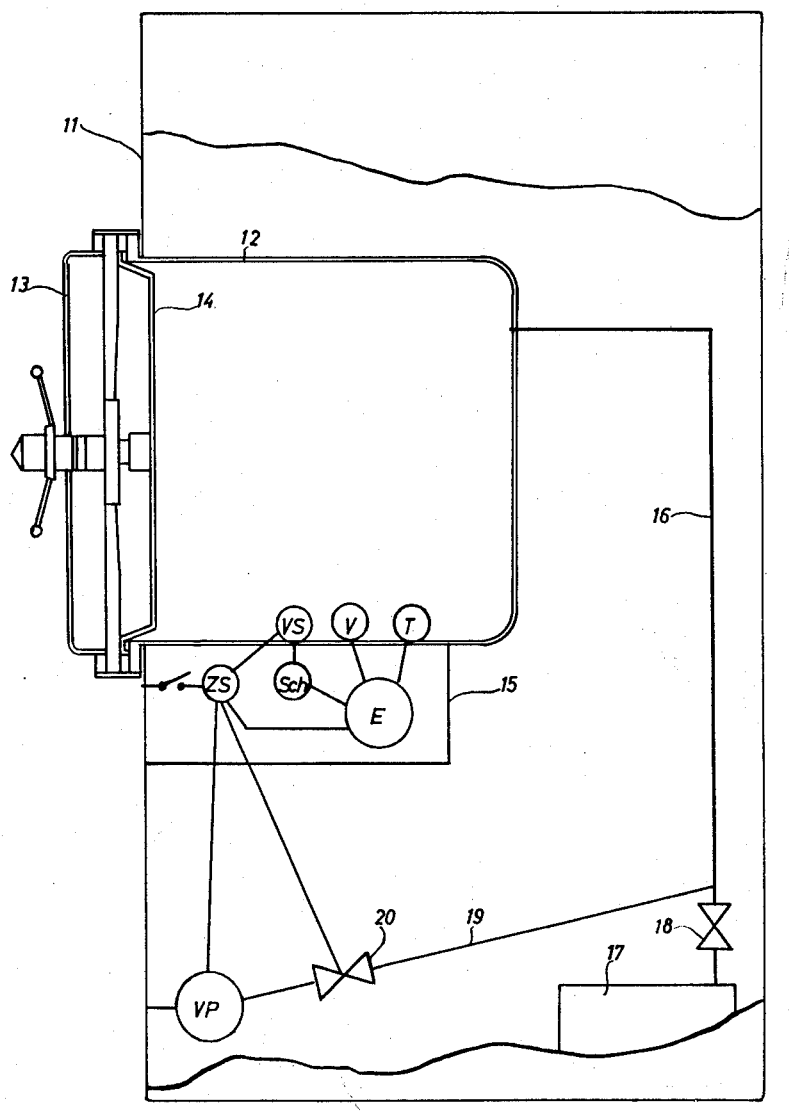

April 23, 1963 J. HUBER 3,086,263
STERILIZING APPARATUS
Filed July 8, 1960 3 Sheets-Sheet 1

INVENTOR.
JOHANN HUBER

April 23, 1963

J. HUBER 3,086,263

STERILIZING APPARATUS

Filed July 8, 1960

3 Sheets-Sheet 2

INVENTOR.
JOHANN HUBER
BY

April 23, 1963 J. HUBER 3,086,263
STERILIZING APPARATUS
Filed July 8, 1960 3 Sheets-Sheet 3

INVENTOR.
JOHANN HUBER

United States Patent Office 3,086,263
Patented Apr. 23, 1963

3,086,263
STERILIZING APPARATUS
Johann Huber, Peter Muller Str. 21, Munich, Germany
Filed July 8, 1960, Ser. No. 41,673
Claims priority, application Germany July 10, 1959
8 Claims. (Cl. 21—98)

The present invention relates to a sterilizing apparatus with a sterilizing chamber for the material to be sterilized, as e.g. linen, bandaging material, surgical instruments or rubber gloves or the like, and with a vacuum pump for evacuating the sterilization chamber as well as a program control device with pressure- or temperature-responsive organs and with a step-by-step system, which means control automatically the single phases of the sterilizing program, as e.g. evacuating, temperature rising time, sterilization, de-aeration.

As was proved by detailed scientific research the time which is necessary in order to execute the sterilizing of the material depends to a large extent on the quality of the vacuum in the sterilizing chamber. However, it is not possible to obtain the same amount of vacuum in each sterilizing process in the chamber, the quality of the vacuum in the sterilizing chamber varies. This is the reason that up to now a vacuummeter which was adjusted to a predetermined vacuum value was used to control the step in the program from the vacuum phase to the temperature increase phase. This vacuum value was chosen in such a way that it was obtained according to experience also with unfavourable circumstances. As soon as this vacuum was present in the sterilizing chamber, the vacuummeter switched over to the rising time phase, i.e. a steam valve was opened in order to let vapour stream into the sterilizing chamber. When the sterilizing temperature was reached, it was switched over to the next program phase, e.g. by a temperature responsive organ, i.e. to the sterilizing, and at the same time the steam valve was automatically closed and a time switching piece was put into operation, which determined the duration of the sterilizing time. In this case the period was predetermined, because it was known from experience that with the adjusted vacuum a specific time was absolutely necessary in order to obtain a sure sterilizing of the material.

In this kind of program control it was disadvantageous that the effective end performance of a heavy duty pump could not be fully used, as, as already stated above, the switching point had to be fixed, for safety reasons, for the course of the program as a predetermined vacuum end value far lower than the end performance of the vacuum pump. It would not make any sense to fix this switching point in the vicinity of this end value, as it would not always be surely reached. A "gripping" of the program control in the pre-vacuum phase would be the consequence. It is known to switch over, by a special commutation device in such a case by automatic control, the complete apparatus to the so-called long-time sterilization with low temperature. But this has the disadvantage of a considerable prolongation of the total sterilization time. In order to eliminate the remaining air from the material to be sterilized, and to obtain a sterilization of high quality, a vacuum value, which is as high as possible, would be obtained.

The object of the invention is, therefore, a sterilizing apparatus with a program control device, which controls the sterilizing process automatically in such a way that it works in the shortest possible time with full security for a perfect sterilization.

Another object of the invention is to design the program control device in such a way that by means of said device automatically the actually obtained quality of a program phase, e.g. the vacuum phase, is established as a variable actual value and according to this actual value the shortest time for the following phase e.g. the sterilization, is regulated, whereby the control device scans the actual value varying within the phase (vacuum phase) as to the time in its optimum amount and upon this basis, according to the established size, fixes the value of the following phase (sterilization). If under favourable presuppositions a high vacuum is reached, the sterilizing time will be accordingly made short by the device according to the invention during a following phase. If because of less favourable pre-suppositions less high vacuum values are reached, the steriling time is accordingly longer without it being necessary to switch over to a long time sterilization.

For this purpose the invention provides that in the program control device there is incorporated a time piece switch, which switches from the vacuum phase to the temperature rising time phase, as well as a measuring control device which comprises a vacuum measuring apparatus measuring the vacuum value attained at the end of the vacuum phase, as well as an accumulator accumulating this value and a time transmitter to be regulated by the vacuum measuring device depending upon the attained vacuum value, which determines the duration of the sterilization phase.

It is particularly advantageous if the measuring control device comprises an organ establishing the attained temperature and correcting accordingly the time transmitter in the determination of the duration of the sterilization phase. This measure makes it possible to achieve that e.g. the duration of the sterilization phase can be still further shortened if the temperature reached in the sterilizing chamber is higher than the temperature which had been predetermined in this connection. If this temperature is, however not reached, the sterilization time is automatically extended to the necessary extent.

The vacuum measuring device may be arranged according to the invention as an organ transforming variations of pressure into variations of an electric resistance, whereby then the accumulator is an electrically working accumulator, in which the vacuum measuring value is proportionally accumulated.

Figure 2:
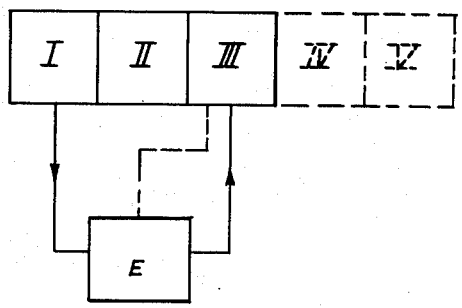
Figure 3:
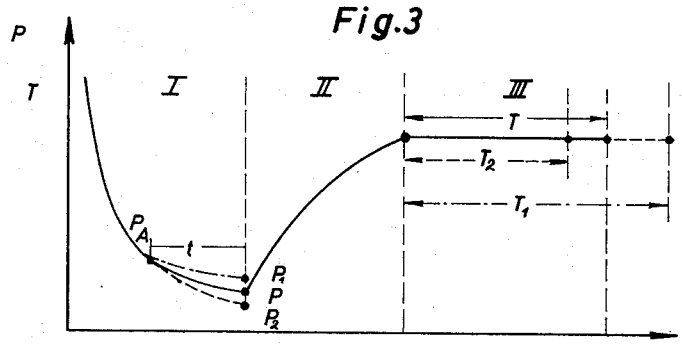
Figure 4:
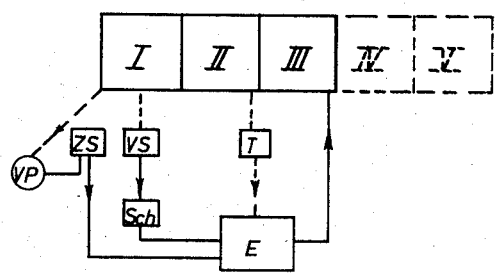
Figure 5:
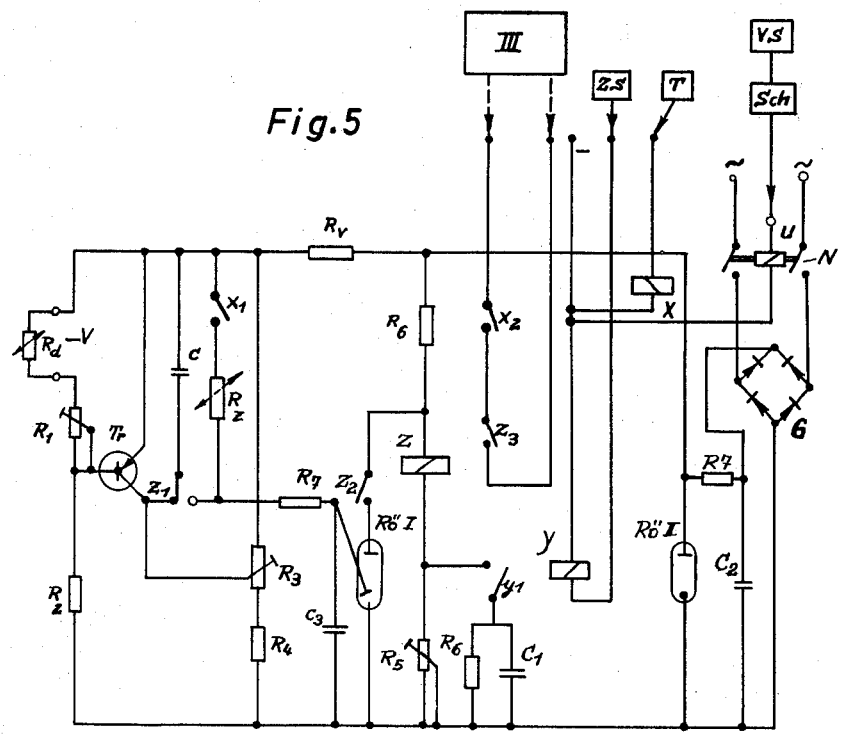
Figure 6:
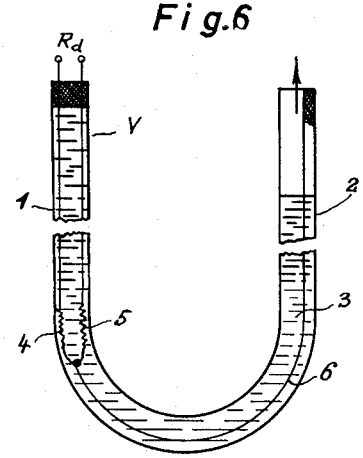

Other objects and advantages will be apparent from a consideration of the specification and claims:

FIG. 1 shows the sterilizing apparatus diagrammatically in side elevation,

FIG. 2 is a general diagrammatic representation of the appertaining program control, FIG. 3 is a partial diagram (graphic representation of the program to be controlled), FIG. 4 shows details for the diagram according to FIGURE 2, FIG. 5 is an electric wiring diagram of an additional device for the control of the program according to the invention, and FIG. 6 is a diagrammatic representation of a vacuum measuring organ, which serves for the permanent measuring of the pre-vacuum.

The sterilizing apparatus has a sheet metal casing 11, in which a sterilizing chamber 12 is arranged in such a way that its opening 14 is accessible from the outside after the opening of a cover 13. There is furthermore within the casing a container 15 receiving all of the parts of the program control device and a vacuum pump VP. A line 16 leading to a steam generator 17 opens into the sterilizing chamber 12. Between the sterilizing chamber 12 and the steam generator 17 a valve 18 is incorporated which may be e.g. a magnetic valve. Between this steam valve 18 and the sterilizing chamber 12 an evacuation line 19 opens into the line 16, which evacuation line leads to the vacuum pump VP. In this line 19 a further valve 20 is incorporated, which may likewise be a magnetic valve. It is, however, also possible to arrange the valves as mechanical valves operated by push rods controlled by a cam shaft, which latter is rotated by an electric motor through a gear mechanism. The arrangement of these valves is, however, not a part of this invention.

It is assumed that the complete sterilizing program is composed of five different phases, which are represented in FIGURE 2 by five different fields marked with the Roman figures I–V. In this table the symbols mean:

I=the phase of the pre-vacuum, i.e. the evacuation of the sterilizing chamber,
II=the phase of the temperature increase time, i.e. the rising of the temperature in the sterilizing chamber by letting-in hot steam,
III=the phase of the sterilization, i.e. the action of the necessary sterilizing temperature on the material to be sterilized,
IV=the phase of the exhaustion, i.e. the elimination of the steam from the sterilizing chamber by a new evacuation,
V=the phase of the aerating, i.e. the letting-in of atmospheric air into the sterilizing chamber.

If a sterilizing process is initiated by pressing on the starting button of the sterilizing apparatus, the program control device begins automatically the continuous switching from program phase to program phase. As far as for this purpose in the sterilizing apparatus according to the invention usual devices or control organs are used, they are not shown, as they are generally known.

For executing a sterilizing process according to the invention a measuring control device E is incorporated in the program control device, which determines the sterilization time III depending upon the reached end value of the pre-vacuum I.

As can be seen from the diagram shown in FIGURE 3 the vacuum value P reached at the end of the pre-vacuum I is measured by the device E and is accumulated during the rising time II. The sterilization time III is determined automatically by the device E depending upon the measured and accumulated vacuum value. Thus a medium vacuum value P gives a time T for the sterilization time III, while a longer time $T_1$ corresponds to a lower vacuum end value $P_1$ and a shorter time $T_2$ to a higher vacuum end value $P_2$.

In the sterilizing chamber 12 a vacuum switch VS is incorporated, which is adjusted in such a way that it responds to a specific vacuum value PA (FIGURES 1 and 4). The vacuum value PA is chosen in such a way that a value is reached in any case according to experience. It is thus avoided that the program control "sticks." The vacuum switch VS switches on, as soon as the value PA is reached, a time piece switch ZS and at the same time by means of a step-by-step switching device Sch, the current supply for the device E. The time piece switch ZS switches-off, after a pre-determined constant time $T_{const}$, the vacuum pump VP and switches the device E to accumulating, so that the vacuum value P respectively $P_1$ or $P_2$ prevailing at the end of the pre-vacuum I is established by the device E and is accumulated. Simultaneously the time piece switch ZS makes still a third switching by further switching the step-by-step switching device Sch. Thereby the vacuum valve 20 is closed and the steam valve 18 is opened, so that thus the rising time II is initiated. The step-by-step switching device Sch simultaneously leaves the device E switched-on.

At the end of the rising time II the device E, by a temperature measuring organ T, receives an initiating impulse, which causes that, by the device E, the rising time II is terminated and the sterilization time III is initiated. Thereby the steam valve 18 is closed at the end of the rising time II. The duration of the sterilization time III is determined automatically by the device E, depending upon the accumulated vacuum value and the temperature obtained.

At the end of the sterilization time III the step-by-step device is put into operation which opens in known manner the vacuum valve 20 and switches on the vacuum pump VP (exhausting IV) and switches off after a pre-determined time these organs and lets air flow in from the outer atmosphere into the sterilizing chamber (aeration V). As these program phases IV and V are a usual, the phases I to III, essential for the invention, are alone described hereinafter.

FIGURE 5 shows a wiring diagram of the device E switched-off. If the vacuum switch VS responds when the vacuum value PA is reached, then the circuit for the relay U is closed by the step-by-step switching device Sch, which relay closes the net-work switch N of the device E. By means of the rectifier G the A.C. net work potential is rectified and the rectified voltage is smoothed by the resistance $R_7$ and the condenser $C_2$ and is stabilized by the valve Rö II.

The direct current voltage derived from the voltage divider $R_3$ and $R_4$ through the pre-resistance $R_v$ lets the condenser C open. The transistor $T_r$ having the condenser C connected to the collector, and whose emitter has, in series with the resistances $R_1$ and $R_2$, which are connected to the basis of the transistor, a vacuum measuring organ V with the resistance $R_d$, which will be described in detail later. The resistance $R_d$ increases with rising vacuum, and the condenser voltage is thus decreased till at the end of the pre-vacuum I the time piece switch ZS switches off the vacuum pump and closes the circuit for the relay Y. The relay contact $y_1$ switches the condenser $C_1$ and the resistance $R_6$ in parallel to the resistance $R_5$ lying in the circuit of the pre-excited relay Z, which is connected through the resistance $R_6$ to the full direct current voltage. The relay Z attracts and the relay contacts $z_1$, $z_2$ and $z_3$ come into the work position. Thereby the condenser C is switched-off from the transistor $Tr$. The condenser loading which was present last remains accumulated, as the discharging circuit is still open. Furthermore the anode voltage is applied, by the relay contact $z_2$, to the gas discharge tube Rö I through the pre-resistance $R_6$. This valve cannot yet ignite, as the voltage on the ignition electrode is still lower than the ignition voltage.

By closing the relay contact $z_3$ the switching circuit for the sterilization time is only prepared, as the relay contact $x_2$ remains still open.

At the end of the rising time II the relay $x$ is switched-on by a measuring organ T for the temperature. The contact $x_1$ of this relay switches the discharging resistance $R_2$ parallel to the condenser C which is already connected through the resistance $R_7$ with the ignition electrode of the valve Rö I which is connected to a small condenser $C_3$ to the negative side of the device. The relay contact $x_2$ of the relay X is closed simultaneously with the contact $x_1$ and thus the switching circuit is closed for the beginning of the sterilization time III.

The sterilizing time is ended when the voltage on the ignition electrode of the valve Rö I reaches, because of the discharge of the condenser C, the ignition voltage and the valve Rö I ignites, whereby the relay Z is de-energized and the relay contact $z_3$ opens the switching circuit. The relay contact $z_2$ switches-off the anode voltage of the valve Rö I, this latter is extinguished and the condenser C is again connected with the measuring circuit by the contact $z_1$.

By switching-out the switching circuit because of the opening of the relay contact $z_3$, the step-by-step-switching device Sch is switched further by one step, whereby the next operation, e.g. the exhaustion IV is initiated and the relay U controlling the current supply to the device E is switched-off. The device E is now again in its starting position.

The vacuum measuring organ V comprises according to FIGURE 6 a glass tube bent in the shape of a U, one leg 1 of which is sealed air-tight on its one extremity. The other leg 2 is open and is connected e.g. with the sterilizing chamber to be evacuated. The mercury 3 is filled into the glass tube under vacuum and stands in the leg 1 up to the closed extremity.

In the leg 1 two parallel resistance wires are introduced, which form together the resistance $R_d$. Springs 4 and 5 take care of the uniform tensioning of the resistance wires and a tensioning wire 6 keeps the resistance wires in their position.

If now the vacuum in the leg 2 is sucked in by the vacuum to be measured, the mercury level in the other leg 1 drops by the corresponding value. The resistance value of the switched-on resistance wires increases. According to the vacuum value, which is reached at the end of the program phase I the voltage in the condenser C varies and this voltage is thus proportional to the measured vacuum end value.

The vacuum measuring organ V measures the absolute vacuum values, i.e. independent of the barometric pressure at the moment. As the resistance wires are provided in the air-tight leg 1 of the glass tube, measuring errors by outer influences are avoided to the utmost.

For less high vacuum end values and a less exact vacuum end value measuring, e.g. when disinfecting material, also both legs of the vacuum measuring organ may be open. The measuring values are then, however, depending upon the prevailing barometrical pressure.

In order to adapt the sterilization time also to possible temperature variations, a temperature responsive resistance arranged in the chamber is chosen preferably for the discharging resistance $R_z$, the value of which is decreased with increased temperature and increased with falling temperature.

In order to control other values depending on each other the wiring diagram of the device E can easily be modified accordingly.

I claim:

1. Sterilizing apparatus comprising, in combination, a sterilization chamber; a vacuum source; means, including a first valve means, connecting said vacuum source to said chamber; a source of sterilizing steam, means, including a second valve means, connecting said steam source to said chamber; and an automatic program control device connected to said valve means and operable, when activated, to open said first valve means; said device including timing means operable, a preset time interval after said activation, to close said first valve means and to open said second valve means to initiate a chamber heating period during which the chamber temperature is increased, means operable to measure the vacuum value of said chamber at the end of said preset time interval and to transfer said value to a storage means, and sterilization period determining means, including other timing means controlled by said storage means, operable, at the end of said chamber heating period, to close said second valve means and to open said first valve means a preset time interval after each closing of said second valve means inversely proportional to said vacuum value.

2. Sterilization apparatus as claimed in claim 1 including temperature measuring means to measure the temperature attained during said chamber heating period and to introduce into said sterilization period determining means a correction factor proportional to such attained temperature.

3. Sterilization apparatus as claimed in claim 1, in which said vacuum valve measuring means comprises a U-shape vessel having one of its legs filled with mercury and closed air tight, the other leg thereof being open and communicating with said chamber; and a pair of resistance wires extending in spaced parallel relation through said one leg and having an electric potential applied thereto.

4. Sterilization apparatus as claimed in claim 1, in which said timing means comprises a constant speed timer; and a vacuum operated switch in said chamber operable when the vacuum value therein attains a predetermined value to start said timer; said timing means thereafter controlling the operation of said automatic program control device.

5. Sterilization apparatus as claimed in claim 1, wherein said vacuum measuring means comprises a transducer operable to convert pressure values into electric values; said storage means comprising an electric accumulator connected to said transducer and receiving therefrom a charge proportional to the measured vacuum value.

6. Sterilization apparatus as claimed in claim 5, including a charge circuit and a discharge circuit for said electric accumulator; switch means controlled by said timing means and normally closing said charge circuit, said timing means operating said switch means to open said charge circuit at the end of the preset time interval during which said chamber is connected to said vacuum source; and other switch means operable by said timing means at the beginning of the sterilization period to close said discharge circuit to control the length of the sterilization period in accordance with the accumulated charge of said electric accumulator.

7. Sterilization apparatus as claimed in claim 6, including a temperature responsive resistance incorporated in said discharge circuit and subjected to the temperature of said chamber.

8. Sterilization apparatus as claimed in claim 6, including an electric valve in said discharge circuit triggered conductive by the discharge of said accumulator; said electric valve effecting operation of both of said switch means to open said discharge circuit and to close said charge circuit.

References Cited in the file of this patent
UNITED STATES PATENTS

| | | |
|---|---|---|
| 2,899,266 | Gewalt et al. | Aug. 11, 1959 |
| 2,912,532 | Jennings | Nov. 10, 1959 |